United States Patent
Yang

(10) Patent No.: US 9,025,349 B2
(45) Date of Patent: May 5, 2015

(54) POWER SYSTEM AND STARTING METHOD THEREOF WITH SMALL CHANGED OR UNCHANGED PWM OUTPUT

(71) Applicant: Shenzhen China Star Optoelectronics Technology Co., Ltd, Shenzhen (CN)

(72) Inventor: Xiang Yang, Shenzhen (CN)

(*) Notice: Subject to any disclaimer, the term of this patent is extended or adjusted under 35 U.S.C. 154(b) by 233 days.

(21) Appl. No.: 13/699,742

(22) PCT Filed: Oct. 25, 2012

(86) PCT No.: PCT/CN2012/083504
§ 371 (c)(1),
(2) Date: Nov. 26, 2012

(87) PCT Pub. No.: WO2014/043977
PCT Pub. Date: Mar. 27, 2014

(65) Prior Publication Data
US 2014/0085946 A1  Mar. 27, 2014

(30) Foreign Application Priority Data
Sep. 24, 2012  (CN) .......................... 2012 1 0356678

(51) Int. Cl.
*H02M 1/36* (2007.01)

(52) U.S. Cl.
CPC ...................................... *H02M 1/36* (2013.01)

(58) Field of Classification Search
CPC .......... H02M 2001/0087; H02M 1/36; H02M 3/33507; H02M 7/517; G05F 1/468
USPC ..................... 323/238, 242, 243, 901; 363/49
See application file for complete search history.

(56) References Cited

U.S. PATENT DOCUMENTS

| 4,806,842 A | 2/1989 | Bittner |
| 7,906,945 B2 * | 3/2011 | Kao et al. ...................... 323/238 |
| 8,228,037 B2 * | 7/2012 | Furukawa et al. ............ 320/134 |
| 2004/0228152 A1 * | 11/2004 | Solie ................................ 363/49 |
| 2007/0030709 A1 * | 2/2007 | Kitagawa ......................... 363/49 |
| 2010/0052636 A1 * | 3/2010 | Takagi et al. .................. 323/281 |

FOREIGN PATENT DOCUMENTS

| CN | 1581660 A | 2/2005 |
| CN | 101340142 A | 1/2009 |
| CN | 102447380 A | 5/2012 |
| CN | 102545572 A | 7/2012 |
| WO | WO2009068745 A1 | 6/2009 |

OTHER PUBLICATIONS

Tao Ying, The International Searching Authority written comments, Jun. 2013, CN.

* cited by examiner

*Primary Examiner* — Jue Zhang
*Assistant Examiner* — Lakaisha Jackson

(57) ABSTRACT

A power system and a starting method thereof includes a power output circuit, a loop circuit, a soft start circuit, and a constant-current source that supplies power to the soft start circuit. The loop circuit includes a loop circuit capacitor. The power system further includes a precharge circuit that charges the loop circuit capacitor, and the precharge circuit charges the loop circuit capacitor when the soft start circuit charges the power output circuit.

9 Claims, 2 Drawing Sheets

POWER SYSTEM AND STARTING METHOD THEREOF WITH SMALL CHANGED OR UNCHANGED PWM OUTPUT

TECHNICAL FIELD

The present disclosure relates to the field of liquid crystal displays (LCDs), and more particularly to a power system and a starting method thereof.

BACKGROUND

Operation of a power circuit of a liquid crystal display (LCD) device is usually controlled by a pulse width modulation (PWM) circuit. However, the moment when the power circuit is connected or disconnected, impulse current or output voltage overshoot may be generated, which easily damages the PWM circuit and other electronic components. Therefore, in a converter of the LCD device or other power system, a soft start circuit is added to avoid over-high input current. Generally, the soft start circuit preferentially controls drive DUTY of power source to control the input current of the power circuit. When voltage of the power circuit is boosted to a determined voltage, the soft start circuit is turned off which turns on a loop circuit to control output of the power circuit. In a switching process of the soft start circuit, voltage of a loop circuit capacitor of the loop circuit is gradually increased from zero. During the time that the voltage of the loop circuit capacitor is increased from zero, output of the PWM is reduced suddenly, and abnormal output voltage may result if the voltage of the loop circuit capacitor is overhigh at this moment.

SUMMARY

In view of the above-described problems, the aim of the present disclosure is to provide a power system with small changed or unchanged PWM output.

The aim of the present disclosure is achieved by the following technical scheme. A power system, comprising:
a power output circuit;
a soft start circuit coupled to an input end of the power output circuit;
a constant-current source that supplies power to the soft start circuit;
and a loop circuit coupled to the power output circuit; the loop circuit comprises a loop circuit capacitor.

The power system further comprises a precharge circuit that charges the loop circuit capacitor, and the precharge circuit charges the loop circuit capacitor before the soft start circuit of the power system is turned off causing the loop circuit of the power system to be turned on to supply power.

An input end of the precharge circuit is coupled to the constant-current source, and an output end of the precharge circuit is coupled to the loop circuit capacitor. The precharge circuit comprises a precharge switch, and the precharge switch is turned on before the soft start circuit of the power system is turned off causing the loop circuit of the power system to be turned on to supply power.

The constant-current source is coupled to the power output circuit by the soft start switch. The precharge circuit is coupled to the loop circuit capacitor by the precharge switch. The loop circuit is coupled to the power output circuit by a transfer switch. Logical operation of the soft start switch is the same as logical operation of the precharge switch, and is opposite to logical operation of the transfer switch.

The soft start circuit comprises a first comparator; an inverting input end of the first comparator is coupled to a first reference voltage, a non-inverting input end of the first comparator is coupled to the constant-current source and is coupled to a ground terminal of the power system by a soft start capacitor, and an output end of the first comparator is coupled to control ends of the soft start switch, the precharge switch and the transfer switch.

The loop circuit comprises a second comparator; a non-inverting input end of the second comparator is coupled to a second reference voltage, an inverting input end of the second comparator is coupled to a load feedback, and an output end of the second comparator is coupled to the power output circuit by the transfer switch. The loop circuit capacitor is in series between the output end and the inverting input end of the second comparator.

When voltage of the soft start capacitor is less than the first reference voltage, the first comparator turns on the soft start switch and the precharge switch, and turns off the transfer switch; when the voltage of the soft start capacitor is greater than the first reference voltage after the soft start capacitor is fully charged, the first comparator turns off the soft start switch and the precharge switch, and turns on the transfer switch.

The aim of the present disclosure is further achieved by the following technical scheme. A power system, comprising:
a power output circuit;
a soft start circuit coupled to an input end of the power output circuit;
a constant-current source that supplies power to the soft start circuit;
and a loop circuit coupled to the power output circuit;
the loop circuit comprises a loop circuit capacitor. The power system further comprises a precharge circuit that charges the loop circuit capacitor, and the precharge circuit charges the loop circuit capacitor when the soft start circuit charges the output of power circuit.

In one example, an input end of the precharge circuit is coupled to the constant-current source, and an output end of the precharge circuit is coupled to the loop circuit capacitor. The loop circuit capacitor is charged by the constant-current source to enable the loop circuit capacitor to have certain voltage.

In one example, the precharge circuit comprises a precharge switch, and the precharge switch is turned on before the soft start circuit of the power system is turned of causing the loop circuit of the power system to be turned on supply power.

In one example, the constant-current source is coupled to the power output circuit by the soft start switch, the precharge circuit is coupled to the loop circuit capacitor by the precharge switch, and the loop circuit is coupled to the power output circuit by the transfer switch. Logical operation of the soft start switch is the same as logical operation of the precharge switch, and is opposite to logical operation of the transfer switch.

In one example, the soft start circuit comprises a first comparator; an inverting input end of the first comparator is coupled to a first reference voltage, a non-inverting input end of the first comparator is coupled to the constant-current source and is coupled to a ground terminal of the power system by the soft start capacitor, and an output end of the first comparator is coupled to control ends of the soft start switch, the precharge switch and the transfer switch.

The loop circuit comprises a second comparator; a non-inverting input end of the second comparator is coupled to a second reference voltage, an inverting input end of the second comparator is coupled to a load feedback, and an output end is coupled to the power output circuit by the transfer switch. A loop circuit capacitor is in series connection between the output end and the inverting input end of the second comparator.

When voltage of the soft start capacitor is less than the first reference voltage, the first comparator turns on the soft start switch and the precharge switch, and turns off the transfer switch. When the voltage of the soft start capacitor is greater than the first reference voltage after the soft start capacitor is fully charged, the first comparator turns off the soft start switch and the precharge switch, and turns on the transfer switch.

A starting method of the power system, comprising:

A: soft start step: controlling output of the power system to gradually increase to the preset normal value from low value by a soft start circuit;

B: normal start step: switching to the loop circuit to normally control the output of the power system after the output of the power system in step A reaches the preset normal value;

In the step A, when performing the soft start step, the loop circuit capacitor of the loop circuit is precharged.

In one example, the soft start circuit and the loop circuit capacitor are both is supplied by a constant-current source.

In one example, the loop circuit capacitor is charged by a precharge circuit, an input end of the precharge circuit is coupled to the constant-current source, and an output end of the precharge circuit is coupled to the loop circuit capacitor.

In one example, the precharge circuit comprises a precharge switch and is coupled to the loop circuit capacitor by the precharge switch, and the precharge circuit turns on the precharge switch when the soft start circuit controls the power system. When the soft start circuit stops control, the soft start circuit turns off the precharge switch.

In one example, the precharge switch is a bipolar junction transistor (BJT).

Because in the soft start step, before the soft start circuit of the power system of the present disclosure is turned off causing the loop circuit of the power system to be turned on to control the output of the power system, the loop circuit capacitor of the loop circuit is charged by the precharge circuit in advance, when the soft start circuit of the power system is turned off causing the loop circuit of the power system to be turned on to control the output of the power system after soft start finishes, the loop circuit capacitor is not charged by the loop circuit. Thus, abnormal output voltage caused by charging the loop circuit capacitor is avoided.

Legends: 10. soft start circuit; 20. loop circuit; 30. precharge circuit; 40. constant-current source; 50. output circuit.

DETAILED DESCRIPTION

The present disclosure will further be described in detail in accordance with the figures and the examples.

Figure 1:
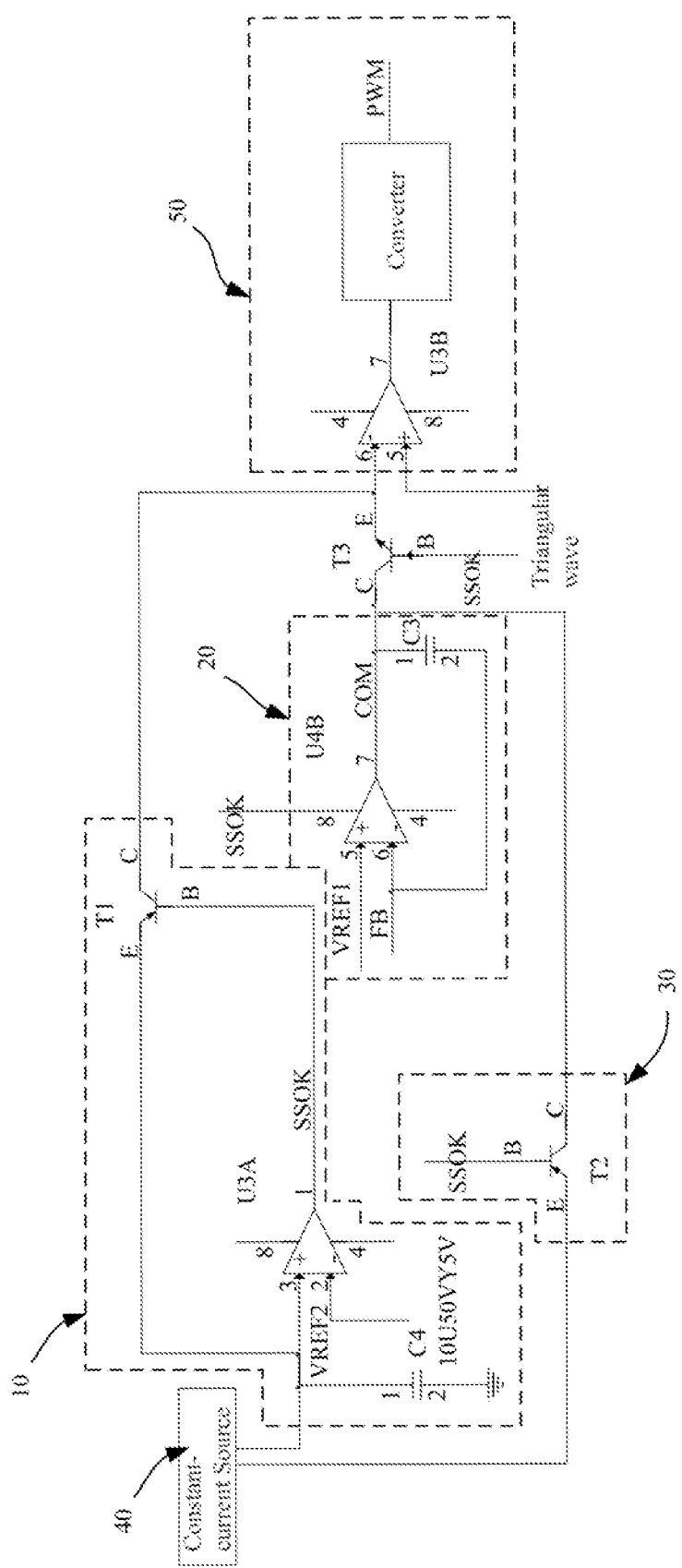
FIG. 1 is a start control circuit diagram of a power system of an example of the present disclosure.

The present disclosure provides a power system. As shown in FIG. 1, the power system comprises a power output circuit 50, a soft start circuit 10, a constant-current source 40 that supplies power to the soft start circuit 10, and a loop circuit 20. The loop circuit 20 comprises a loop circuit capacitor C3. An input end of the soft start circuit 10 is coupled to the constant-current source 40, an output end of the soft start circuit 10 is coupled to an input end of the power output circuit 50, and an output end of the loop circuit 20 is coupled to the input end of the power output circuit 50. The power system further comprises a precharge circuit 30 that charges the loop circuit capacitor C3, and the precharge circuit 30 charges the loop circuit capacitor C3 before the soft start circuit of the power system is turned off causing the loop circuit of the power system to be turned on to supply power (namely the soft start circuit of the power system is turned off causing the loop circuit of the power system to be turned on to control the output of the power system).

The power system is preferentially controlled by the soil start circuit 10 when the power system starts, and the constant-current source 40 is coupled to the power output circuit 50 by a soft start switch T1. The precharge circuit 30 is coupled to the loop circuit capacitor C3 by a precharge switch T2. The loop circuit 20 is coupled to the power output circuit 50 by a transfer switch T3. Logical operation of the soft start switch T1 is the same as logical operation of the precharge switch T2, and is opposite to logical operation of the transfer switch T3. The soft start circuit 10 comprises a first comparator U3A. An inverting input end of the first comparator U3A is coupled to a first reference voltage VREF2, a non-inverting input end of the first comparator U3A is coupled to the constant-current source and is coupled to a ground terminal of the power system by the soft start capacitor C4, and an output end of the first comparator U3A is coupled to control ends of the soft start switch T1, the precharge switch T2, and the transfer switch T3.

The loop circuit 20 comprises a second comparator U4B. A non-inverting input end of the second comparator U4B is coupled to a second reference voltage VREF1, an inverting input end of the second comparator U4B is coupled to a load feedback, and an output end of the second comparator U4B is coupled to the power output circuit 50 by the transfer switch T3. A loop circuit capacitor C3 is in series between the output end and the inverting input end of the second comparator U4B.

When the output of the power system is controlled by the soft start circuit, the soft start capacitor C4 is not fully charged, voltage of the soft start capacitor C4 is less than the first reference voltage VREF2, and the first comparator U3A outputs a low level signal to turn on the soft start switch T1 and the precharge switch T2, and turn off the transfer switch T3.

After the output of the power system controlled by the soft start circuit 10 reaches a preset normal value, namely the soft start circuit 10 stops controlling the output of the power system, the soft start capacitor C4 is fully charged, the voltage of the soft start capacitor C4 is greater than the first reference voltage VREF2, and the first comparator U3A outputs a high level signal (namely the SSOK signal shown in the FIG. 1) to turn off the soft start switch T1 and the precharge switch T2 and turn on the transfer switch T3. At this moment, the soft start circuit 10 stops controlling the output of the power system, and the soft start circuit 10 of the power system is turned off causing the loop circuit 20 of the power system to be turned on t to control the output of the power system.

During the time that the output of the power system is controlled by the soft start circuit 10, the loop circuit capacitor C3 is charged by the precharge circuit 30. An input end of the precharge circuit 30 is coupled to the constant-current source 40, and an output end of the precharge circuit 30 is coupled to the loop circuit capacitor C3. At this moment, when the soft start circuit 10 of the power system is turned off causing the loop circuit 20 of the power system to be turned on to control the output of the power system, the loop circuit capacitor C3 is charged by the precharge circuit 30 in advance, which avoids abnormal output voltage caused via the loop circuit capacitor C3 charged by the loop circuit 20 after the soft start circuit 10 of the power system is turned off causing the loop circuit 20 of the power system to be tuned on to control the output of the power system. The loop circuit capacitor C3 of the loop circuit 20 is charged by the constant-current source 40 so that the voltage of the loop circuit capacitor C3 reaches normal voltage when the soft start stops. In process of turning off the soft start circuit 10 to turn on the loop circuit 20, the loop circuit capacitor C3 has a small effect or no effect on the power supply process of the loop circuit 20 when the loop circuit 20 supplies power to the power output circuit 50, which has a small effect or no effect on the output circuit 50 so that the output circuit 50 reaches a stable value to normally operate.

In the example, the precharge switch T2 is a bipolar junction transistor (BJT), and the BJT is a pnp BJT. A control end of the BJT is coupled to the output end of the first comparator of the soft start circuit.

In the example, the input end of the precharge circuit is coupled to the constant-current source 40, namely the loop circuit capacitor is directly charged by the constant-current source 40 in fact. Optionally, the input end of the precharge circuit can be coupled to other power source as well, which is not limited to the mode provided by the example.

Figure 2:
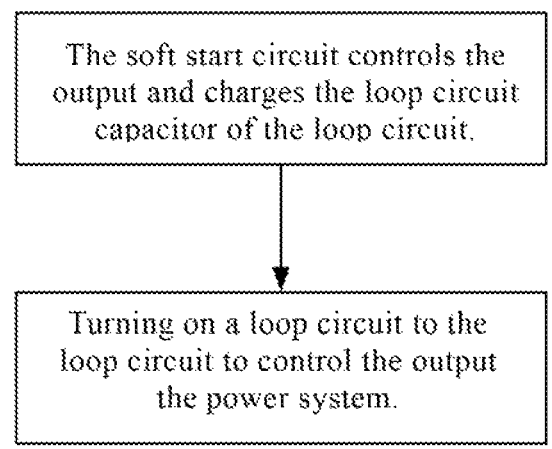
FIG. 2 is a flow diagram of a starting method of a power system of an example of the present disclosure.

FIG. 2 shows a starting method of a power system, comprising:

A: soft start step: controlling output of the power system to gradually increase to a preset normal value from a low value by a soft start circuit;

When performing the soft start step, a loop circuit capacitor of a loop circuit is precharged.

B: normal starting step: turning on to the loop circuit to normally control the output of the power system after the output of the power system in step A reaches the preset normal value.

When the soft start circuit supplies power to an output circuit, the loop circuit capacitor is precharged by the power system to enable the loop circuit capacitor to have a determined voltage. In the process of turning off the soft start circuit to turn on the loop circuit, voltage of the loop circuit capacitor is kept to be coincident with voltage when the soft start stops, thereby reaching the normal value. Because the loop circuit capacitor has the determined voltage, the loop circuit does not charge the loop circuit capacitor any longer when the loop circuit supplies power to the output circuit, or the loop circuit capacitor may have no effect or have a small effect on the output circuit when the loop circuit supplies power to the output circuit, so that the voltage of the output circuit reaches a stable value to operate normally.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which, should be considered to belong to the protection scope of the present disclosure.

The invention claimed is:

1. A power system, comprising:
a power output circuit;
a soft start circuit coupled to an input end of the power output circuit;
a constant-current source that supplies power to the soft start circuit;
a loop circuit coupled to the power output circuit; and
a precharge circuit that charges the loop circuit capacitor;
wherein the loop circuit comprises a loop circuit capacitor;
wherein the precharge circuit charges the loop circuit capacitor before the soft start circuit of the power system is turned off causing the loop circuit of the power system to be turned on to supply power;
wherein an input end of the precharge circuit is coupled to the constant-current source, and an output end of the precharge circuit is coupled to the loop circuit capacitor; the precharge circuit comprises a precharge switch, the precharge switch is turned on before the soft start circuit of the power system to supply power;
wherein the constant-current source is coupled to the power output circuit by the soft start switch, the precharge circuit is coupled to the loop circuit capacitor by the precharge switch, and the loop circuit is coupled to the power output circuit by a transfer switch; logical operation of the soft start switch is the same as logical operation of the precharge switch, and is opposite to logical operation of the transfer switch; wherein the soft start circuit comprises a first comparator; an inverting input end of the first comparator is coupled to a first reference voltage, a non-inverting input end of the first comparator is coupled to the constant-current source and is coupled to a ground terminal of the power system by the soft start capacitor, and an output end of the first comparator is coupled to control ends of the soft start switch, the precharge switch, and the transfer switch;
wherein the loop circuit comprises a second comparator; a non-inverting input end of the second comparator is coupled to a second reference voltage, a inverting input end of the second comparator is coupled to a load feedback, and the output end of the second comparator is coupled to the power output circuit by the transfer switch; the loop circuit capacitor is in series between the output end and the inverting input end of the second comparator;
when voltage of the soft start capacitor is less than the first reference voltage, the first comparator turns on the soft start switch and the precharge, and turns off the transfer switch; when the voltage of the soft start capacitor is greater than the first reference voltage after the soft start capacitor is fully charged, the first comparator turns off the soft start switch and the precharge switch, and turns on the transfer switch.

2. A power system, comprising:
a power output circuit;
a soft start circuit coupled to an input end of the power output circuit;
a constant-current source that supplies power to the soft start circuit;
a loop circuit coupled to the power output circuit; and
a precharge circuit;
wherein the loop circuit comprises a loop circuit capacitor, the precharge circuit charges the loop circuit capacitor;
wherein the precharge circuit charges the loop circuit capacitor before the soft start circuit of the power system is turned off causing the loop circuit of the power system to be turned on to supply power.

3. The power system of claim 2, wherein an input end of the precharge circuit is coupled to the constant-current source, and an output end of the precharge circuit is coupled to the loop circuit capacitor.

4. The power system of claim 3, wherein the precharge circuit comprises a precharge switch, and the precharge switch is turned on before the soft start circuit of the power system is turned off causing the loop circuit of the power system to be turned on to supply power.

5. The power system of claim 4, wherein the constant-current source is coupled to the power output circuit by a soft start switch, the precharge circuit is coupled to the loop circuit capacitor by the precharge switch, and the loop circuit is coupled to the power output circuit by a transfer switch; logical operation of the soft start switch is the same as logical operation of the precharge switch, and is opposite to logical operation of the transfer switch.

6. The power system of claim 5, wherein the soft start circuit comprises a first comparator; an inverting input end of the first comparator is coupled to a first reference voltage, a non-inverting input end of the first comparator is coupled to the constant-current source and is coupled to a ground terminal of the power system by the soft start capacitor, and an output end of the first comparator is coupled to control ends of the soft start switch, the precharge switch and the transfer switch;

the loop circuit comprises a second comparator; a non-inverting input end of the second comparator is coupled to a second reference voltage, an inverting input end of the second comparator is coupled to a load feedback, and an output end of the second comparator is coupled to the power output circuit by the transfer switch; the loop circuit capacitor is in series between the output end and the inverting input end of the second comparator;

when voltage of the soft start capacitor is less than the first reference voltage, the first comparator turns on the soft start switch and the precharge switch, and turns off the transfer switch; when the voltage of the soft start capacitor is greater than the first reference voltage after the soft start capacitor is fully charged, the first comparator turns off the soft start switch and the precharge switch, and turns on the transfer switch.

7. A starting method of a power system, comprising:

A: soft start step: controlling output of the power system to gradually increase to a preset normal value from a low value by a soft start circuit;

B: normal starting step: turning on a loop circuit to normally control the output of the power system after the output of the power system in step A reaches the preset normal value;

wherein in the step A, when performing the soft start step, a loop circuit capacitor of the loop circuit is precharged, wherein the soft start circuit and the loop circuit capacitor are both supplied by a constant-current source, wherein an input end of the precharge circuit is coupled to the constant-current source, and an output end of the precharge circuit is coupled to the loop circuit capacitor.

8. The starting method of the power system of claim 7, wherein the precharge circuit comprises a precharge switch and is coupled to the loop circuit capacitor by the precharge switch, and the soft start circuit turns on the precharge switch when the power system is controlled by the soft start circuit; when the soft start circuit stops controlling, the soft start circuit turns off the precharge switch.

9. The starting method of the power system of claim 7, wherein the precharge switch is a bipolar junction transistor (BJT).

* * * * *